United States Patent
Santhar et al.

(10) Patent No.: US 10,691,488 B2
(45) Date of Patent: Jun. 23, 2020

(54) ALLOCATING JOBS TO VIRTUAL MACHINES IN A COMPUTING ENVIRONMENT

(71) Applicant: International Business Machines Corporation, Armonk, NY (US)

(72) Inventors: Sathya Santhar, Ramapuram (IN); Gopal Bhageria, Rajarhat (IN); Pooja Malik, New Delhi (IN); Vikram Yadav, Farrukhabad (IN)

(73) Assignee: International Business Machines Corporation, Armonk, NY (US)

(*) Notice: Subject to any disclaimer, the term of this patent is extended or adjusted under 35 U.S.C. 154(b) by 195 days.

(21) Appl. No.: 15/829,389

(22) Filed: Dec. 1, 2017

(65) Prior Publication Data
US 2019/0171483 A1 Jun. 6, 2019

(51) Int. Cl.
G06F 9/48 (2006.01)
G06F 9/455 (2018.01)
G06Q 30/06 (2012.01)

(52) U.S. Cl.
CPC ........ G06F 9/4881 (2013.01); G06F 9/45558 (2013.01); *G06F 2009/4557* (2013.01);
(Continued)

(58) Field of Classification Search
CPC .............. G06F 9/4881; G06F 9/45558; G06F 2009/45595; G06F 2009/4557; G06Q 30/0619; G06Q 30/0613; G06Q 30/0623
See application file for complete search history.

(56) References Cited

U.S. PATENT DOCUMENTS 9,407,514 B2 8/2016 Shiva et al.
9,760,928 B1* 9/2017 Ward, Jr. ........... G06Q 30/0619
(Continued)

OTHER PUBLICATIONS

A Speculative Approach to spatial-temporal efficiency without multi-objective optimization in a heterogeneous cloud environment, Security Comm. Networks 2016; 9:4002-4012, Aug. 14, 2016 (Year: 2016).*

(Continued)

*Primary Examiner* — Wynuel S Aquino
*Assistant Examiner* — Kevin X Lu
(74) *Attorney, Agent, or Firm* — Scully, Scott, Murphy & Presser, P.C.; Scott Dobson, Esq.

(57) ABSTRACT

A method and system for allocating data processing jobs between public and private cloud based on various SLA and cost factors associated to each job, and particularly, job allocation using minimal cost association by applying logistic regression. Jobs are analyzed based on various factors such as compute and operational intensity, kind of environment, I/O operations bandwidth, costs involved to deploy in private and public cloud and all these parameters are balanced to arrive at minimized cost. Methods are implemented for receiving input data representing a current request to run a job on a virtual machine, associated job characteristics, features associated with VMs running on a public networked or private networked host computing environment, and features associated with the host computing environment. The learned classifier model is run for selecting one of: the public network or private network as a host computing environment to run said current requested job on a VM resource, the learned model based on a minimized cost function.

14 Claims, 7 Drawing Sheets

(52) U.S. Cl.
CPC ........... *G06F 2009/45595* (2013.01); *G06Q 30/0613* (2013.01); *G06Q 30/0619* (2013.01); *G06Q 30/0623* (2013.01)

(56) References Cited

U.S. PATENT DOCUMENTS

| | | | |
|---|---|---|---|
| 2010/0306379 A1* | 12/2010 | Ferris | G06F 9/5072 |
| | | | 709/226 |
| 2012/0131591 A1* | 5/2012 | Moorthi | G06Q 10/06 |
| | | | 718/104 |
| 2016/0182622 A1 | 6/2016 | DeCusatis et al. | |
| 2016/0328273 A1 | 11/2016 | Molka et al. | |
| 2017/0097841 A1* | 4/2017 | Chang | H04L 67/10 |

OTHER PUBLICATIONS

Sun et al., "Cloud service selection: State-of-the-art and future research directions", Journal of Network and Computer applications 45 (2014) 134-150, 2014 (Year: 2014).*

Cunha et al., "Job Placement Advisor Based on Turnaround Predictions for HPC Hybrid Clouds", Elsevier, vol. 67, Feb. 2017, pp. 35-46.

Marcus et al., "Workload Management for Cloud Databases via Machine Learning", 2016 IEEE 32nd International Conference on Data Engineering Workshops (ICDEW), May 16-20, 2016.

* cited by examiner

ALLOCATING JOBS TO VIRTUAL MACHINES IN A COMPUTING ENVIRONMENT

FIELD

Embodiments of the present invention generally relate to computer system functionality for allocating jobs to be run on virtual machines (VMs) running on hosts in a cloud computing environment, and particularly to systems and methods for allocating jobs to VMs in cloud environment based on present and future features learning and cost.

BACKGROUND

Virtual environments offer various benefits which include but are not limited to diverse cluster management, cost effective job execution and workload consolidation. They operate both in private and public cloud configuration and the determination of the right node depends on various system level solutions (SLS) and cost factors associated to each job. But the scheduling is at job level and it only considers the operational parameters of the job.

SUMMARY

A system, method and computer program product is provided that enables dynamic job allocation in a network, e.g., private or public cloud, while minimizing operational cost by analyzing impact of running other jobs or impact of pending jobs in job queue.

In one aspect, there is performed a dynamic scheduling of VM jobs that takes into account the whole private/public cloud environment and including the impact of running other jobs or the impact of future jobs in a job queue.

The system, method and computer program product performs an allocating of VM jobs that are loosely coupled or tightly coupled across a public and private cloud environment based on optimized cost and a supervised learning method.

The system and method provides a cost effective model driven by supervised machine learning where the corpus is created by feeding in the features analyzed by the job analyzer of previous jobs.

In one aspect, the system and methods employed provides a solution for allocating jobs to run on a virtual machine (VM) of a particular host computing environment. The system comprises: a memory storage device storing a program of instructions; a processor device receiving the program of instructions to configure the processor device to: receive, from a user, input data representing a current request to run a job on a VM, the current job having associated job characteristics; receive input data representing features associated with VMs running on a public networked or private networked host computing environment, the environment comprising features associated with a host computing environment; run a learned model for selecting one of: the public network or private network as a host computing environment to run the current requested job on a VM resource, the learned model based on a minimized a cost function including VM features, host environment features and job characteristics; and allocate the VM resource to run the current requested job on the selected host computing environment.

According to one aspect of the present invention, there is provided a method for allocating jobs to run on a virtual machine (VM) of a particular host computing environment. The method comprises: receiving, from a user, at a hardware processor, input data representing a current request to run a job on a VM, the current job having associated job characteristics; receiving, at the hardware processor, input data representing features associated with VMs running on a public networked or private networked host computing environment, and features associated with the host computing environment; running, at the hardware processor, a learned model for selecting one of: the public network or private network as a host computing environment to run the current requested job on a VM resource, the learned model based on a minimized a cost function including VM features, host environment features and job characteristics; and allocating, using the hardware processor, the VM resource to run the current requested job on the selected host computing environment.

In a further aspect, there is provided a computer program product for performing operations. The computer program product includes a storage medium readable by a processing circuit and storing instructions run by the processing circuit for running a method. The method is the same as listed above.

Other features and advantages of the present invention will become more understandable through the following description.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals are used to represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In one aspect, there is provided a resource provisioning method and system for enabling dynamic job allocation and scheduling of jobs in a (private or public) cloud environment for minimizing operational cost by analyzing impact of running other jobs or impact of pending jobs, e.g., in a job queue. The method and system: 1) utilizes a job analyzer for analyzing jobs to identify volume of operational intensity, a number of available virtual machine (VMs), input-output (I/O) operations involved, number of jobs already in progress/waiting in a job queue and associated cost when deployed in the cloud; 2) determines a compute and data intensity of jobs in public/private clouds, and allocating jobs to the public/private cloud such that operational cost is minimum, e.g., comes within SLA (service level agreement) time and budget constraint or other SLA factors, wherein the operational cost is determined based on VM features, cloud features and job characteristics; and 3) utilizing prior experience (previous job allocations) that the system has gained by using supervised learning approach (machine learning) for optimizing allocation of new jobs in the cloud. With respect to SLA factors, for example, a client or customer may contract with the service provider for services via an SLA, and the provider prepares the appropriate resources in advance of start of service. The customer (job) costs may include a flat fee charged or is billed on a monthly basis.

In embodiments herein, jobs may be of two types in a cloud environment, e.g., serial job or it can be parallel job. Serial jobs are ones which all tasks needs to be run in sequence, i.e., tasks of a serial job can not be run in parallel. Parallel jobs are ones which all or some tasks can be parallelized. Parallel jobs' tasks can be further divided in communicating or non communicating tasks. Loosely coupled tasks are those tasks that may be executed independently of each other and may be handled in parallel. Other tasks may be dependent such that they have to be executed in order. Those tasks that must be executed in order are tightly coupled tasks.

Figure 1:
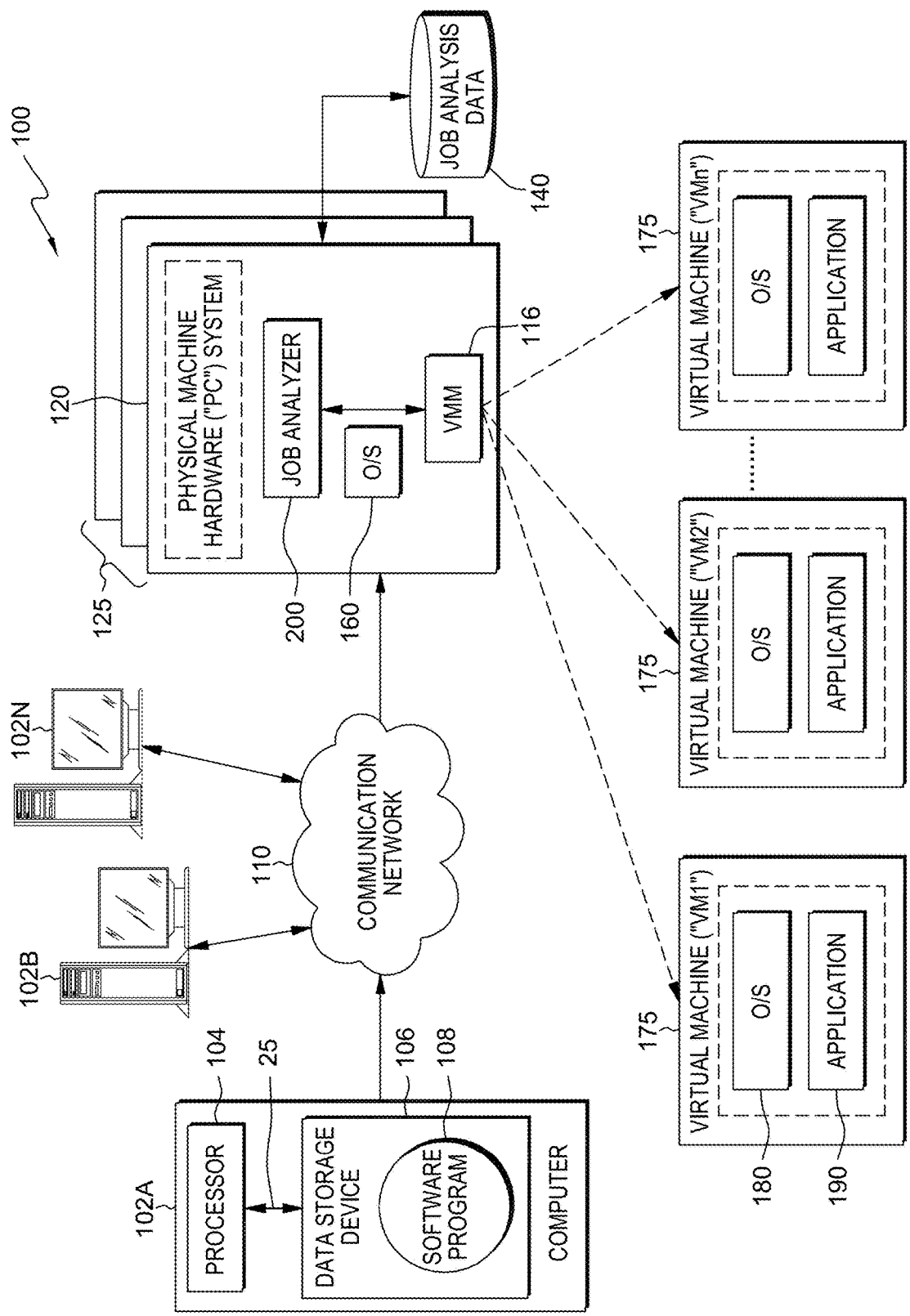
FIG. 1 illustrates an exemplary networked computer environment within which the methods of the present embodiments are run.

FIG. 1 illustrates an exemplary networked computer environment 100 in accordance with one embodiment is depicted. The networked computer environment 100 may include multiple computer devices, e.g., 102A, 102B, . . . , 102N, with each computer device, e.g., 102A including a processor 104 and a data storage device 106 that is enabled to run one or more software programs 108. The networked computer environment 100 may also include a server 114 that is enabled to run a virtual machine monitor (VMM) or "hypervisor" 116 which is computer software, firmware or hardware that creates and runs virtual machine instances at the server for running services or computing platforms for users. The server 114 is a computer on which is run one or more virtual machine instances and is alternately referred to as a host machine.

Computer devices, e.g., 102A, 102B, . . . , 102N may communicate with server 120 over a communication network 110. The networked computer environment 100 may include a plurality of servers 120, only one of which is shown. For example, networked computer environment 100 may include a data center, e.g., multiple networked computer servers 125 used by an organization for the remote storage, processing, or distribution of large amounts of data. As discussed herein, users of computing devices 102A, 102B, . . . , 102N may request the server to run particular computing "jobs" at a virtual machine, with each job comprising one or more serial or parallel tasks.

As shown in FIG. 1, the server device 120 is a physical hardware device, e.g., a personal computer, server, or cloud computing system, that is provided with an exemplary physical machine 150 providing hardware devices such as one or more hardware processors (CPUs), local memory, e.g., a RAM, a network interface, etc., that are configured to provide a physical operating system environment. Software run on said server include the operating system (O/S 160) and the aforementioned virtual machine monitor (VMM) 116 which is specialized software, e.g., a hypervisor, for emulating the personal computer client 102A or a server's CPU, memory, hard disk storage device, network interface card, and other hardware resources completely, enabling virtual machines 175 to share the server's hardware resources. The hypervisor VM technology may be configured to emulate multiple virtual hardware platforms 175, i.e., multiple VM instances, that are isolated from each other, as known in the art. Each VM 175 includes a virtual operating system O/S 180 and/or application environment 190. An end user using a VM 175 has the same experience on a virtual machine as they would have on dedicated hardware.

In accordance with the embodiments described herein, the exemplary networked computer environment 100 may be configured as a private cloud network, a public cloud network, a local environment, or a hybrid cloud.

Further run on the host machine of a physical hardware system of server device 120 is a VM job analyzer program module 200 that, in one embodiment, is employed to run tests, e.g., I/O tests on one or more host machines, for obtaining performance statistics, storage performance statistics, problem diagnosis, and obtaining details on the operations involved in each job/sub-job (task) that is run on the machine, e.g., I/O trace information of jobs and their sub-jobs. In particular, job analyzer component 200 is utilized for analyzing jobs run on the VMs to identify volume of operational intensity, number of available virtual machine (VMs), input-output (I/O) operations involved, number of jobs already in progress/waiting in a job queue, and associated costs when deploying VMs for operations in the cloud.

In one embodiment, job analysis data collected via the job analyzer program module 200 may be stored locally, e.g., at a local database 140, or remotely in a data center. In such an embodiment, the job analyzer module 200 may obtain the data directly from the data center about the number of virtual machines, the operation details of the "cloud", hardware specifications, costs of different environments and bandwidth available. This can be provided through any application program interface (APIs) from the local repositories in a data center.

Figure 2:
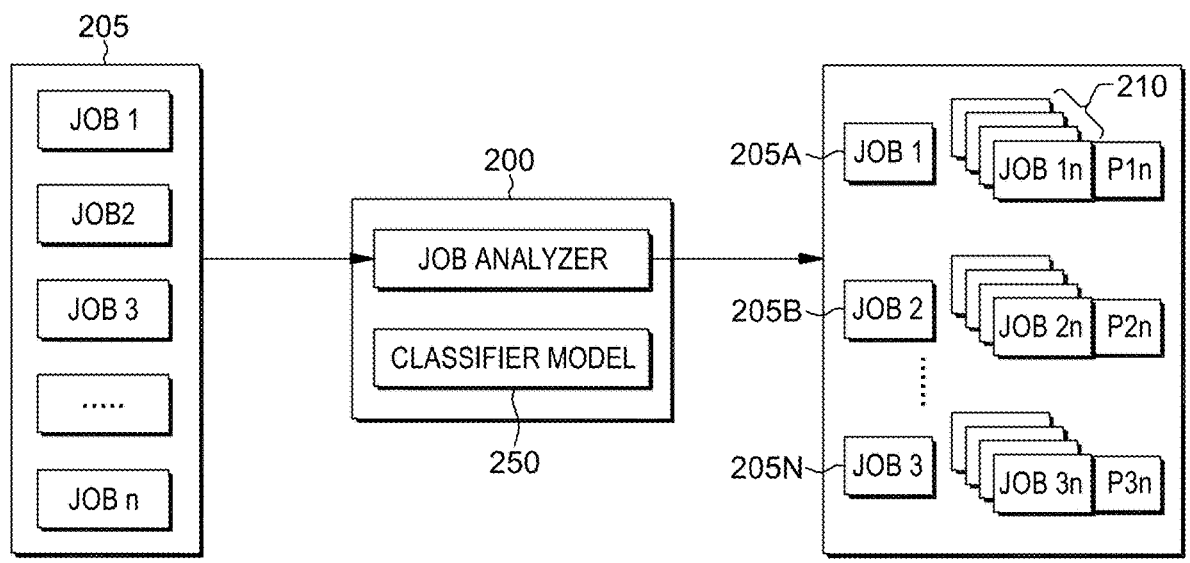
FIG. 2 is a diagram depicting the job analyzer functionality for receiving and allocating job/sub-job requests to according to the methods describe herein.

FIG. 2 shows a further view depicting the functions of the job analyzer module 200 for analyzing, at a host machine, the number of virtual machine instances, cloud details, hardware specifications, cost of different environments and available bandwidth.

More particularly, as shown in FIG. 2, the analyzer 200 may analyze a plurality of jobs 205 on the VMs 175 that are running and/or have run on the VM over time. For each respective job 205A, 205B, . . . , 205N, the analyzer generates and stores associated data including, but not limited to: an identified volume of operational intensity, the kind of environment where the jobs are/were deployed (e.g., public or private cloud), the number and type of I/O operations involved, the number of available VMs and its hardware resources, an amount of bandwidth available for I/O operations, the number of jobs already in progress/waiting in a job queue (not shown) and the associated cost when deployed in either a private cloud environment or public cloud environment.

As further shown in FIG. 2, the analyzer 200 may analyze a plurality of jobs 205 on the VMs 175 that are running and/or waiting on a job queue, and for each respective job 205A, 205B, . . . , 205N, the analyzer identifies any sub-jobs or "tasks" that are associated with the corresponding job. Thus, for example, analyzer 200 may determine that the job 205A includes plural sub-jobs 210.

In one embodiment, the job analyzer component 200 operates in conjunction with a multi-class classifier model 250 that is built using a training dataset that includes—the collected analyzed job/sub-job data including, but not limited to: data representing, for each job and sub-job, an identified volume of operational intensity, the kind of environment where the jobs/sub-jobs were deployed (e.g., public or private cloud), the number and type of I/O operations involved, the number of available VMs and its hardware resources, an amount of bandwidth available for I/O operations, the number of jobs already in progress/waiting in a job queue (not shown) and the associated cost when deployed in either a private cloud environment or public cloud environment.

Figure 3:
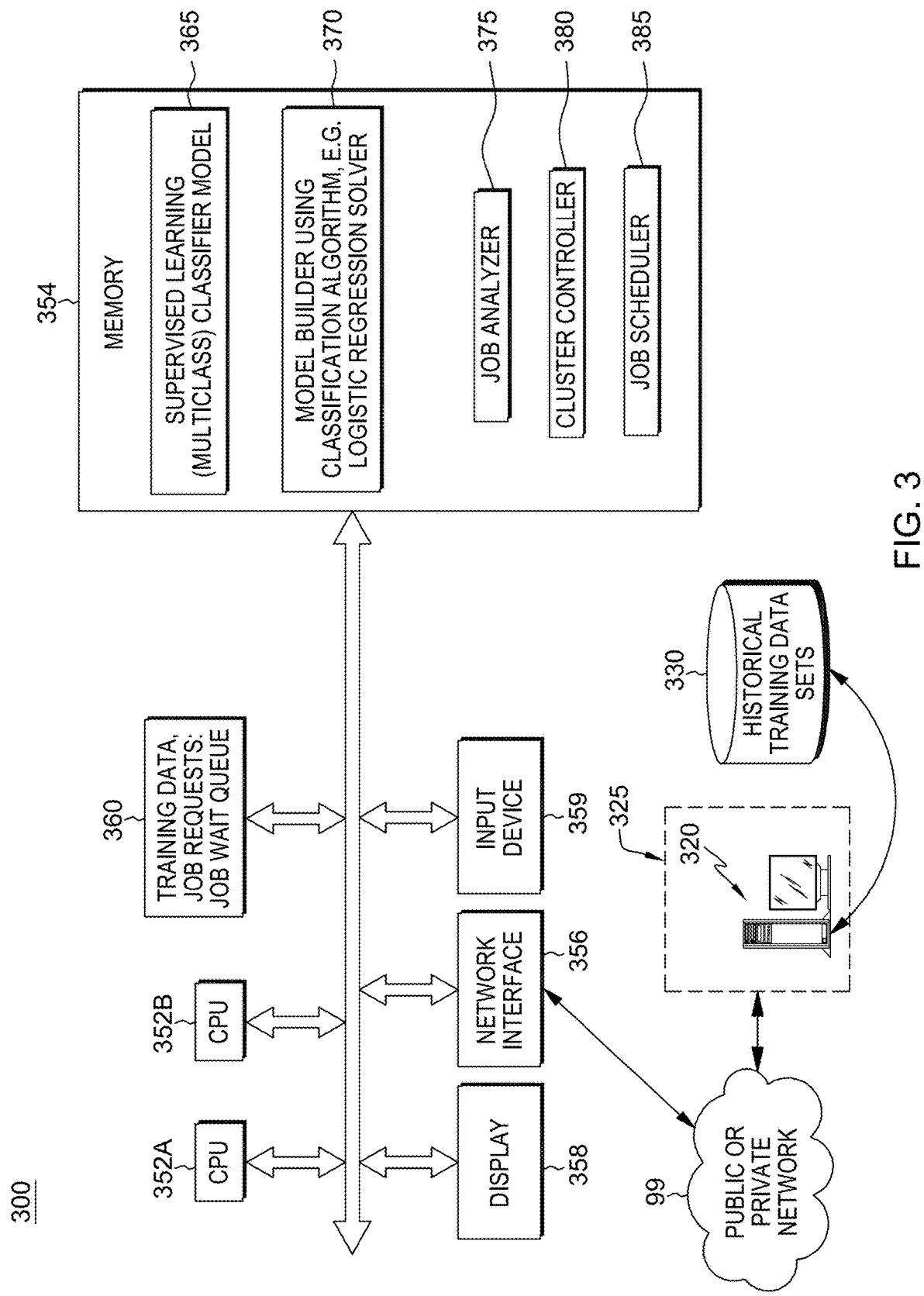
FIG. 3 shows a schematic block diagram of a computer system configured for providing dynamic computing job allocation in cloud (private or public) according to embodiment described herein.

Referring now to FIG. 3, there is depicted a computer system 300 providing dynamic job allocation in cloud (private or public) for minimizing operational cost by analyzing impact of running other jobs or impact of pending jobs, e.g., waiting in a job queue. In some aspects, system 300 may include a computing device, a mobile device, or a server. In some aspects, computing device 300 may include, for example, personal computers, laptops, tablets, smart devices, smart phones, or any other similar computing device.

Computing system 300 includes one or more hardware processors 352A, 352B, a memory 354, e.g., for storing an operating system and program instructions, a network interface 356, a display device 358, an input device 359, and any other features common to a computing device. In some aspects, computing system 300 may, for example, be any computing device that is configured to communicate with a web-site 325 or web- or cloud-based server 320 over a public or private communications network 99. Further, as shown as part of system 300, historical training data sets including training data that includes the collected analyzed job/sub-job data including, but not limited to: data representing and associated with prior jobs and sub-jobs that have been run, including, but not limited to: the above-mentioned identified volume of operational intensity, the kind of environment where the jobs/sub-jobs were deployed (e.g., public or private cloud), the number and type of I/O operations that were involved, the number of VMs that were available and its hardware resources, an amount of bandwidth available for the I/O operations, the number of jobs already in progress/waiting in a job queue (not shown) and the associated cost when deployed in either a private cloud environment or public cloud environment.

Some of this data may stored locally in an attached memory storage device 360, e.g., an associated hard disk storage memory device, or stored in an attached, or a remote memory storage device 330, e.g., a database, and accessed via a remote network connection for input to the system 300.

In the embodiment depicted in FIG. 3, processors 352A, 352B may include, for example, a microcontroller, Field Programmable Gate Array (FPGA), or any other processor that is configured to perform various operations. Processors 352A, 352B may be configured to execute instructions as described below. These instructions may be stored, for example, as programmed modules in memory storage device 354.

Memory 354 may include, for example, non-transitory computer readable media in the form of volatile memory, such as random access memory (RAM) and/or cache memory or others. Memory 354 may include, for example, other removable/non-removable, volatile/non-volatile storage media. By way of non-limiting examples only, memory 354 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 356 is configured to transmit and receive data or information to and from a web-site server 320, e.g., via wired or wireless connections. For example, network interface 356 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 300 to transmit information to or receive information from the server 320.

Display 358 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 358 may include a liquid crystal display (LCD), an e-paper/e-ink display, an organic LED (OLED) display, or other similar display technologies. In some aspects, display 358 may be touch-sensitive and may also function as an input device.

Input device 359 may include, for example, a keyboard, a mouse, a touch-sensitive display, a keypad, a microphone, or other similar input devices or any other input devices that may be used alone or together to provide a user with the capability to interact with the computing device 300.

With respect to the ability of computer system 300 for providing dynamic job allocation in cloud (private or public) for minimizing operational cost by analyzing impact of running other jobs or impact of pending jobs, the system 300 further includes: a memory 360 configured for storing training data sets and other input output data sets that are used to generate/build the classifier model used for the job allocation. In one embodiment, this database 360 may be local to the computer or mobile device system 300, or otherwise, such database 360 may be associated with the remote server 320, over a network.

In one embodiment, the system 300 is a job scheduler and allocation system provides a technology platform providing dynamic job allocation in cloud (private or public) for minimizing operational cost by analyzing impact of running other jobs or impact of pending jobs. The platform at least encompasses supervised machine learning techniques, based on logistic regression, invoking programmed processing modules stored in a device memory 354 thus provide the system with abilities for providing dynamic job allocation in cloud (private or public) for minimizing operational cost by analyzing impact of running other jobs or impact of pending jobs based on received sets of input data.

Thus, as shown in FIG. 3, one program module stored in a device memory 354 may include a supervisory machine learned multiclass classifier module 365 providing the ability to dynamically perform job allocation based on a current received job request. For example, in operation, upon receipt of a request to run a computing job on a VM, the methods activate and run a multiclass logistic regression-based classifier model 365 which generates an output indicating which class is suitable for the requested job, i.e., a class representing a private cloud, or a class indicating a public cloud. In other embodiments, the current job may be classified to run in a private, public, a local environment, or even hybrid cloud environments. Based on this, the job analyzer or host machine will automatically schedule and/or initiate the placement of the job in the respective computing environment.

Figure 4:
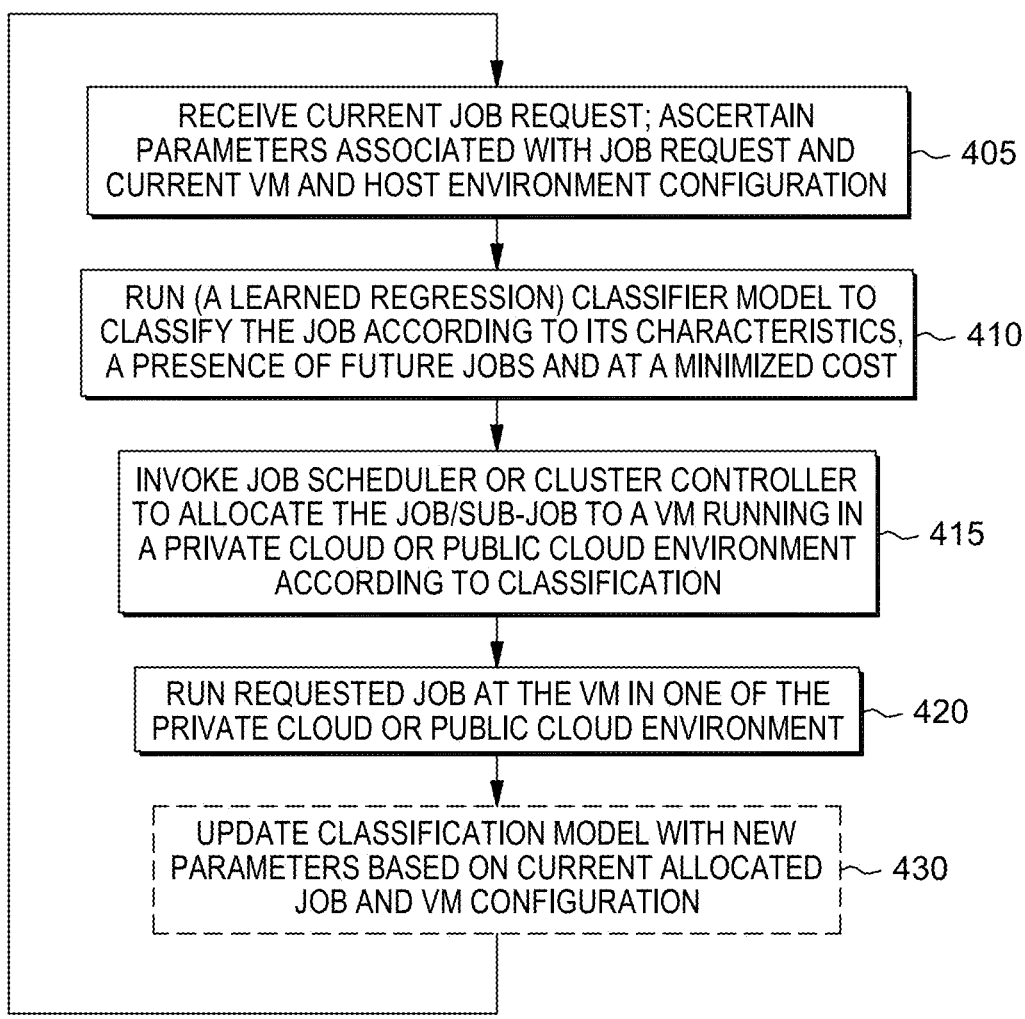
FIG. 4 shows a schematic flowchart of a method for allocating a requested job to a VM that minimizes a cost using a multiclass classifier model according to embodiments of the present invention.

FIG. 4 generally depicts a job allocation recommending process 400 used to recommend a computation job at a VM of a particular hosted computing environment by applying the built machine learned multiclass classifier model of module 365 according to one embodiment.

At 405, the method first includes receive current job request at a job analyzer device configured to allocate the job to run on a VM according to a determine class. Associated with the request are ascertain features associated with request and current VM configuration. The computing system 300 (of FIG. 3) receives a vector of information about the current requested job, e.g., number of sub-jobs or associated tasks, and any time or cost constraints as governed per a service level agreement (SLA). The system 300 further receives data representing an identified volume of operational intensity, number of available virtual machine (VMs), number of input-output (I/O) operations involved, number of jobs already in progress/waiting in a job queue, hardware specifications, cost of different environments when deploying VMs for operating in a particular computing cloud, and available bandwidth.

In one embodiment, the job analyzer is configured to analyze jobs to identify volume of operational intensity, number of available virtual machine (VMs), input-output (I/O) operations involved, number of jobs already in progress/waiting in the job queue and associated cost when deployed in the cloud (associated with a private network or public network).

With this received information, at 410, the system invokes classification module 365 to run (a learned regression) classifier model to classify the current requested job according to its information/characteristics, given the presence of future jobs. That, in addition to generating a cost function calculation for an incoming job, a cost function is additionally calculated for other "waiting" jobs. That is, the jobs waiting in a queue, are also considered to arrive at the likelihood function so that increased cost due to execution of high intensive previous jobs may be reduced This accounts for a possible situation where the job analyzer decides allocating a public cloud for Job 1 and if a second Job 2 has to wait in the queue until Job 1 has to be completed as resources are not available in public cloud to execute job 2, then analyzer might place Job 2 in private cloud.

As an example, considering a computed cost of operation of job 1 in private cloud is $50 and job 2 in private cloud is $100. Then it would have been better to place Job 2 in public cloud and job 1 in private cloud if the analyzer would have got the cost functions outputs of all the jobs (both incoming and waiting). This is the reason to calculate cost functions of all jobs before deciding the environment to run the first job in the queue.

In one embodiment, the multi class classifier model 365 in effect is configured to determine the probabilistic likelihood function (e.g., cost function) for each class, i.e., each computing environment within which that the job can be run. Running the classifier model, the system performs classifying the job according to its characteristics, including the presence of future jobs and further at a minimized cost while adhering to any SLA and/or security constraints. In one embodiment, job characteristics may include, but are not limited to: a number of tasks in the Job and a respective execution time in seconds of the task; a deadline for the Job (e.g., in seconds); any budget constraints.

In one embodiment, a job analyzer module 375 of FIG. 3, is programmed to obtain the data, e.g., from a data center providing the hosting virtual machines, about the current number/availability of virtual machines, details of the hosting cloud, hardware specifications, cost of different environments and available bandwidth. This can be provided through one or more application programming interfaces (APIs), e.g., from the local repositories in the data center. It also analyses the job to get the details on the operations involved in the current job/job request. In exemplary implementations, the data received may include parameter data including, but not limited to: 1) the number of virtual machines in the private cloud and its associated hardware specifications—$V_1$ and $h_1, h_2, h_3, \ldots, h_n$; 2) the number of virtual machines ($V_2$) in the public cloud and its associated hardware specifications and $g_1, g_2, g_3, \ldots, g_n$; 3) a cost per operation measure associated with running of the job in a private cloud or a cost/operation associated with running the job in public cloud; and 4) a measure of current I/O Bandwidth (b) available for a VM, e.g., V=b; 5) a number of tasks (T) already running in the, e.g., VM—T; 6) a security (S) associated with each job/sub-job—S; and a number of Jobs waiting in a job allocation queue, e.g., Q=W.

In one embodiment, at 410, the multi class classifier model 365 generates an output indicating a class which identifies the probabilistic function comparable to a defined threshold when deployed in private or public cloud, and recommends which private or public cloud (class) with a minimum cost involved, while balancing all the received parameters associated with the current and future jobs.

Then, at 415, based on the classification output, the system assigns the job to the selected VM within the determined class, e.g., a private or public, local or hybrid cloud host computing environment. That is, the multiclass classifier output is an indication of which class is suitable, i.e., a private or public cloud. Based on this, the job analyzer places the job to run on a VM in the respective environment, or schedules in a job scheduler to run the job at a particular time.

Particularly, at 415, the multi-class classifier may then invoke functionality of a cluster controller component program module 380 of FIG. 3 used in operating a cloud environment or a job scheduler component 385 of FIG. 3 of the cloud environment to actually perform the allocating of the current requested job in satisfaction of a received request.

Then, at 420, the requested job is run at the VM in one of the classified private, cloud, public cloud, local or hybrid cloud environments as classified.

Over the time, the system is able to associate job characteristics, VM environment features and cloud environment features, and generate the desired job allocations automatically or dynamically based on the received features. Models such as the logistic regression classifier along with supervised learning, easily allows for dynamic job allocation in a manner that minimizes a parameterized cost function.

The job analyzer may feed the training dataset(s) it learns every day to the multi class classifier which determines the probabilistic likelihood (cost) function for each class.

In an embodiment, as indicated at 430, FIG. 4, the multi-class classifier model is continuously updated. That is, the parameters associated with the logistic regression function may periodically updated by periodically learning, e.g., every consecutive day, based on the data received and collected regarding the deployment of jobs to the VMs, the status of the VMs and the operation details collected that day, for example. As will be described, instructions are provided to invoke application of a gradient descent algorithm to the logistic regression for building/updating the classifier model 365.

Returning to the computing system diagram 300 of FIG. 3, in an embodiment, a supervised learning module 370 includes instructions invoked for building the classifier model using a supervised machine learning classification algorithm, e.g., logistic regression.

Figure 5:
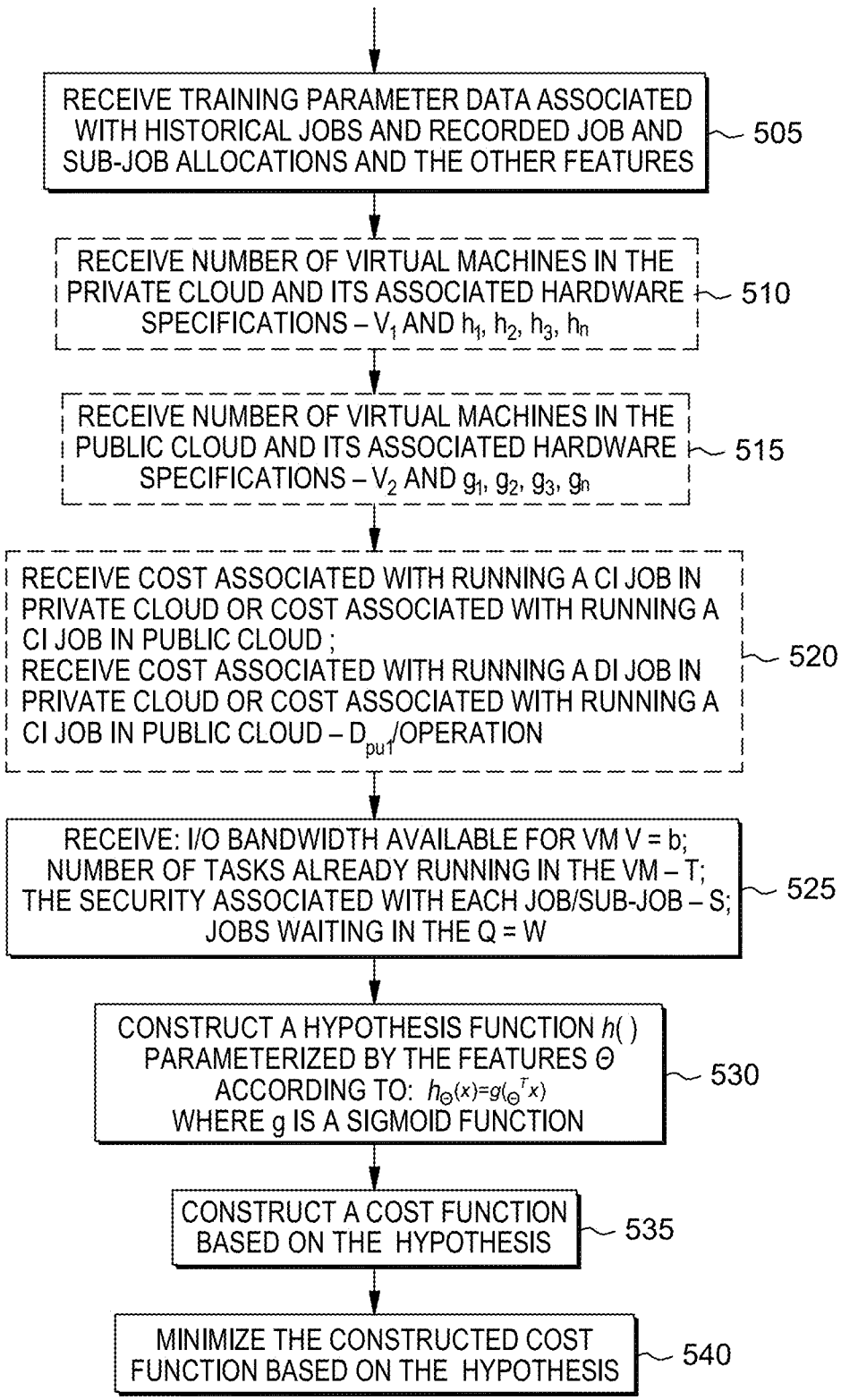
FIG. 5 shows a schematic flowchart of a method for building a multiclass classifier using supervised machine learning according to embodiments of the present invention.

FIG. 5 shows a schematic flowchart of a method 500 for building a multiclass classifier using supervised machine learning for use in dynamic job allocating according to a minimized cost features according to embodiments of the present invention.

In one embodiment, the supervised machine learning technique invoked at module 370 performs logistic regression, and includes instructions for generating a classifier model based on historical training data sets. That is, by keeping historical records of what types of jobs were allocated to which virtual machine instances, characteristics associated with the jobs, and features associated with the VM instances deployed in the cloud, and the cloud features, the system 300 can make intelligent decisions regarding in what hosting cloud environment to allocate running of new job request, e.g., private or public cloud.

In one embodiment, at 505, FIG. 5, the system may include implementing functions for ingesting training sets including prior historical data sets including stored data representing and associated with prior (historical) jobs and sub-jobs that have been run, including, but not limited to: for each job/sub-job: the above-mentioned identified volume of operational intensity, the kind of environment where the jobs/sub-jobs were deployed (e.g., public or private cloud) and the associated hardware specifications at that time, the number and type of I/O operations that were involved, the number of VMs that were available and its hardware resources, an amount of bandwidth available for the I/O operations, the number of jobs already in progress/waiting in a job queue (not shown) and the associated cost when deployed in either a private cloud environment or public cloud environment Thus, for example, the classification learning algorithm ingests stored training data sets associated with past (historical) allocated jobs, a vector of information for use in building the classifier model including: at 510, the number of virtual machines in the private cloud and its associated hardware specifications at that time—$V_1$ and $h_1, h_2, h_3, \ldots, h_n$; and at 515, the number of virtual machines ($V_2$) in the public cloud and its associated hardware specifications and $g_1, g_2, g_3, \ldots, g_n$; and at 520, a cost per operation measure associated with running of the job when run in a private cloud or a cost/operation associated with running the job when run in a public cloud; and at 525, a measure of the I/O Bandwidth (b) available for that VM, e.g., V=b; a number of tasks (T) that were already running in the, e.g., VM–T; and a security (S) associated with each job/sub-job; and a number of Jobs that had been waiting in a job allocation queue, e.g., Q=W, at that time. Any additional information associated with SLA cost or budget and timing constraints may also be ingested for the regression model.

Continuing to 530, FIG. 5, there is depicted the step of constructing a hypothesis function h( ) parameterized by the features of the training data ingested for the job. In one embodiment, the hypothesis function is constructed parameterized by the above features "Θ" according to:

$$h_{\Theta(x)} = g(\Theta^T x)$$

where the function:

$$g(z) = 1/(1+e^{-z})$$

represents the sigmoid or logistic function and "z" is a real number. The parameterized features include the aforementioned received ingested data, e.g., the number of virtual machines deployed in the private cloud and its associated hardware specifications—$V_1$ and $h_1, h_2, h_3, h_n$; the number of virtual machines in the public cloud and its associated hardware specifications—$V_2$ and $g_1, g_2, g_3, g_n$; the Cost associated with running a CI job in private cloud—$C_{pr1}$/operation; the cost associated with running a CI job in public cloud—$C_{pu1}$/operation; the Cost associated with running a DI job in private cloud—$D_{pr1}$/operation; the Cost associated with running a CI job in public cloud—$D_{pu1}$/operation; the Bandwidth available for VM V=b; the number of tasks already running in the VM–T; the security associated with each job/sub-job—S; the number of Jobs waiting in the Q=W.

In one embodiment, the probabilistic hypothesis function for multiclass classifier model would be:

$$h_{\Theta(x)} = P(y_1 = 1, x; \Theta)$$

$$h_{\Theta(x)} = P(y_2 = 1, x; \Theta)$$

where Y1 indicates probability that the job/sub-job should be hosted in private cloud and Y2 indicates public cloud and the corresponding minimized cost function threshold is compared to decide on whether the new job/sub-job has to be hosted in private or public cloud.

Thus, when parameterized by Θ and the other training data set features described above, i.e., the z here becomes $\Theta^T x$, i.e., the $\Theta^T x$ is a parameter in the sigmoid function $g(\Theta^T x)$. Thus, the hypothesis function h( ) parameterized by the features of the training data becomes:

$$h_{\Theta(x)} = g(\Theta_0 + \Theta_1 V_1 + \Theta_2 h_1 h_2 h_n + \Theta_3 C_{pr1} + \Theta_4 C_{pu1} + \ldots)$$

which represents the decision boundary representation of the classifier determined using a logistic regression classification algorithm. In one embodiment, the hypothesis function is an nth order polynomial dependent upon the regression features, e.g., V1, h1h2hn, Cpr1, Cpu1, etc.

Then, as shown at 535, FIG. 5, the module 370 constructs a cost function based on the above hypothesis function which is then minimized in order to obtain a balance between a computational efficiency, cost effectiveness, and I/O operational efficiency. In one embodiment, the cost function for logistic regression based on the parameterized hypothesis function is based on parameters Θ, which Θ parameters have to be fitted. The training set data (e.g., historical data) is one way of choosing and fitting parameters Θ.

In one aspect, there is further defined an optimization object for the cost function using the fit the parameters. In one example, the cost function in regularized logistic regression for the θ parameters is defined as:

$$J_l(\Theta) = 1/m \left[ \sum_{i=1}^{m} y^i \log h_{\Theta(x^i)} + (1-y^i)\log(1-h_\Theta x^i) \right] + (\lambda/2m) \sum_{j=1}^{n} \Theta_j^2$$

where the last summation term is a regularization term, "m" is the number of training examples, "n" is a number of features, $x^{(i)}$ is a feature vector, $x_0=1$ is an intercept term, and λ is a regularization parameter, set to control the fitting of parameters Θ. As the magnitudes of the fitting parameters increase, there will be an increasing penalty on the cost function. This penalty is dependent on the squares of the parameters as well as the magnitude of λ.

It is noted that the regularization term summation after λ does not include $\Theta_0^2$.

The process then proceeds to step 540 where, to minimize cost, a gradient descent algorithm implemented by known automated mathematical solvers, is applied to the regularized logistic regression function to thereby minimize the parameterized cost function J(Θ). This is an iterative process so each parameter may be repeatedly updated using a learning rate. Thus, at 540, FIG. 5, parameters Θ are computed using a gradient descent which minimizes the function J(Θ).

These set of parameters Θ may then be run in classifier model 365 used for future predictions. That is, given an new input job request with an example set of features x, the classifier model invoked at module 365 is run and using the parameters Θ which were generated, a prediction is output indicating which cloud to run the job on, e.g., private or public cloud.

Figure 6:
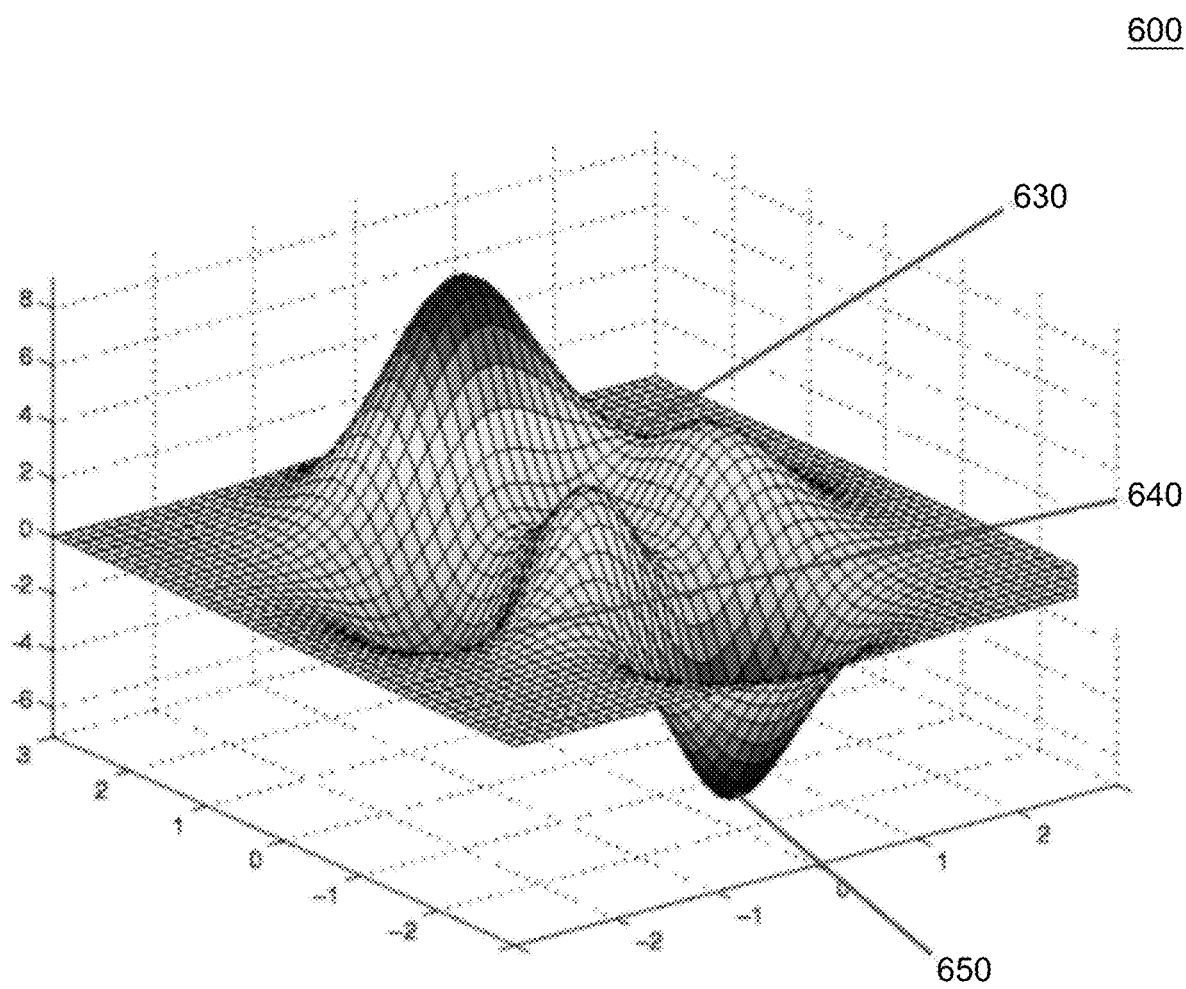
FIG. 6 depicts an output of the gradient descent technique comprising a plot for logistic regression used to find out a global minimum of the parameterized cost function.

FIG. 6 depicts an output of the gradient descent technique comprising a plot 600 for logistic regression used to find out a global minimum 650 of the parameterized cost function J(Θ). For example, one result of applying gradient descent algorithms to a cost function J(Θ) parameterized based on various factors associated with job analysis such as compute and I/O operational intensity, a kind of environment, I/O bandwidth, and overall cost involved to deploy in a private and public cloud, is the balancing of all these parameters with factor weightages (which are based on a sigmoid function) to arrive at minimized cost at 650 for each class. The gradient descent technique generates a global minimum point 650 including a presence of local minima, such as a local minimum resulting when computational efficiency is high at 630, and a local minimum 640 resulting when VM utilization is high.

Further, based on the output 600, job analyzer also analyses the likelihood (i.e., cost) functions of other jobs waiting in the job queue in order to reduce the possibility of paying higher cost for a loosely coupled job in the future due to previous execution of high intensive jobs is reduced.

The multiclass model is periodically fed with training data, and via system 300, it learns every day updating creates a multi class output that identifies the probabilistic function (comparable to a defined threshold when deployed in private or public cloud) for each class, e.g., private or public cloud, and recommends the one with minimum cost involved, balancing all the parameters associated with the current and future jobs.

Figure 7:
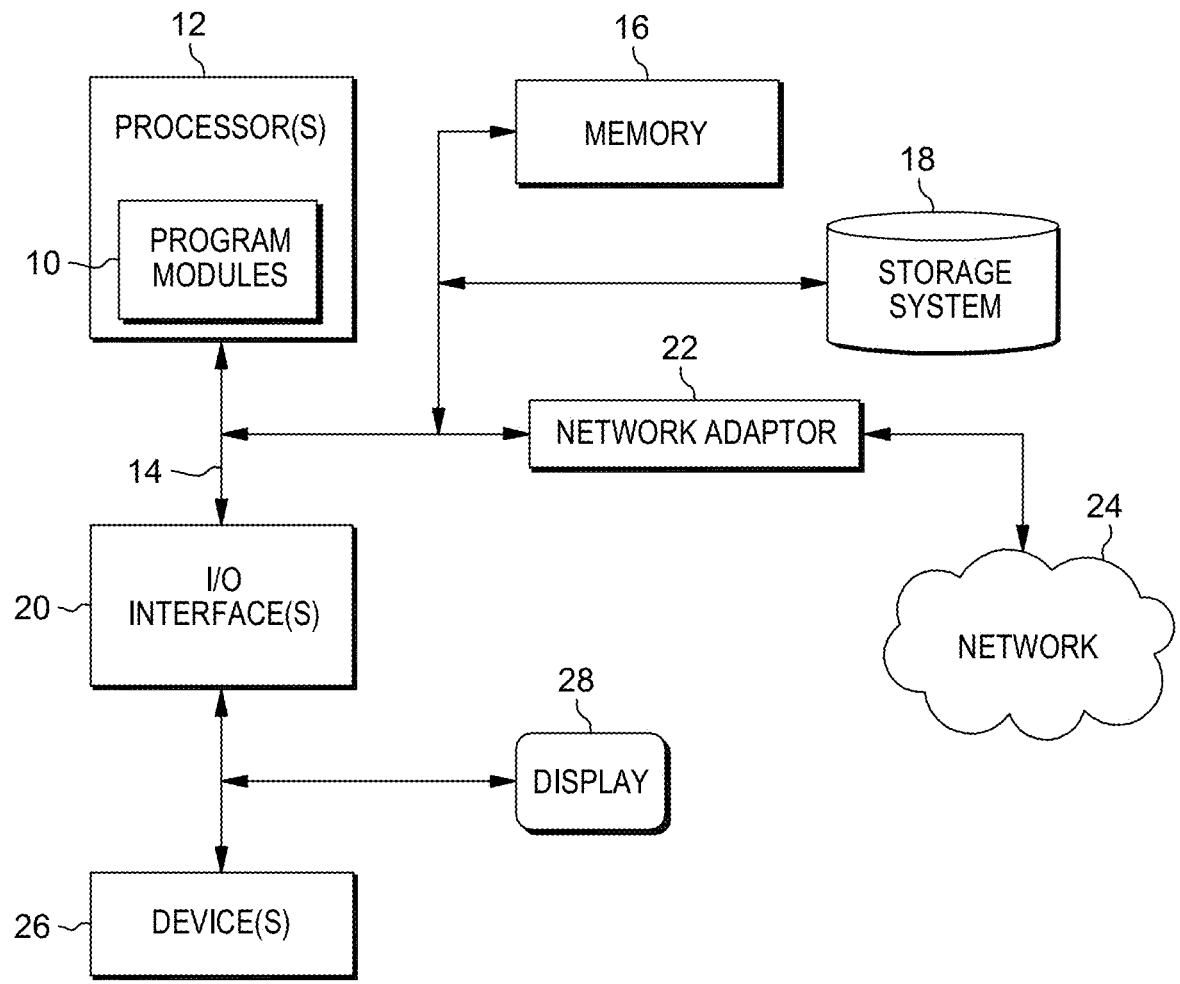
FIG. 7 illustrates an example computing system in accordance with an embodiment.

FIG. 7 illustrates an example computing system in accordance with the present invention that may provide the services and functions associated with allocating jobs in a public or private cloud network in a most cost-efficient way. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 4 and 5.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer system for allocating jobs to run on a virtual machine (VM) of a particular host computing environment, said system comprising:
a memory storage device storing a program of instructions;
a processor device receiving said program of instructions to configure said processor device to:
receive, from a user, input data representing a current request to run a job on a VM, said current job having associated job characteristics;
receive input data representing features associated with VMs running on a public networked or private networked host computing environment, said environment comprising features associated with a host computing environment;
run a learned model for selecting one of: the public network or private network as a host computing environment to run said current requested job on a VM resource, said learned model based on a minimized cost function comprising a probabilistic classifier hypothesis function for a multiclass classifier parameterized according to one or more job characteristics, VM features, and host computing environment features associated with running the current requested job on a VM resource, and fitting parameters with factor weightages based on a sigmoid function to achieve a balance between a computational efficiency, cost effectiveness, and I/O operational efficiency for running the current requested job on the selected private networked or public networked host computing environment; and
allocate the VM resource to run said current requested job on said selected host computing environment.

2. The system of claim 1, wherein said allocating a VM resource comprises
programming a job scheduler to allocate said current job request to run on said VM of said selected host computing environment at a particular time;
trigger a running of said current requested job on said VM of said selected host environment at said programmed time.

3. The system of claim 1, wherein said processor device is further configured to:
receive further input data from a request queue maintaining current additional job requests received from users awaiting allocation to a VM resource, and said input data of current additional job requests used as parameters of said cost function.

4. The system of claim 1, wherein said hardware processor periodically updates said learned model, said updating comprising:
determining whether previous job allocations had higher cost;
re-computes the cost function based on parameters representing characteristics of a prior allocated job of higher cost, said re-computing cost function minimizing one or more parameters to rebalance the cost function.

5. The system of claim 1, wherein said hardware processor is further configured to:
choose and fit parameters Θ of said probabilistic classifier hypothesis function based on a training data set, said training data set comprising one or more of:
historical data representing virtual machine VM availability and I/O bandwidth features for previously running jobs, and corresponding cost of historical jobs that were run;
corresponding historical data representing VM features and hosted environment features; and
characteristics of said previously run jobs.

6. The system of claim 5, wherein said hardware processor is further configured to generate said learned model according to a supervised learning method conducted using said input training data set.

7. A computer-implemented method for allocating jobs to run on a virtual machine (VM) of a particular host computing environment, said method comprising:
receiving, from a user, at a hardware processor, input data representing a current request to run a job on a VM, said current job having associated job characteristics;
receiving, at said hardware processor, input data representing features associated with VMs running on a public networked or private networked host computing environment, and features associated with the host computing environment;
running, at said hardware processor, a learned model for selecting one of: the public network or private network as a host computing environment to run said current requested job on a VM resource, said learned model based on a minimized cost function comprising a probabilistic classifier hypothesis function for a multi-class classifier parameterized according to one or more job characteristics, VM features, and host computing environment features associated with running the current requested job on a VM resource, and fitting parameters with factor weightages based on a sigmoid function to achieve a balance between a computational efficiency, cost effectiveness, and I/O operational efficiency for running the current requested job on the selected private networked or public networked host computing environment; and allocating, using said hardware processor, the VM resource to run said current requested job on said selected host computing environment.

8. The method of claim 7, wherein said allocating a VM resource comprises programming a job scheduler to allocate said current job request to run on said VM of said selected host computing environment at a particular time;

trigger a running of said current requested job on said VM of said selected host environment at said programmed time.

9. The method of claim 7, further comprising:

receiving, at said hardware processor, further input data from a request queue maintaining current additional job requests received from users awaiting allocation to a VM resource, and said input data of current additional job requests used as parameters of said cost function.

10. The method of claim 7, further comprising:

periodically updating, using said hardware processor, said learned model, said updating comprising:

determining whether previous job allocations had higher cost; and re-computing the cost function based on parameters representing characteristics of a prior allocated job of higher cost, said re-computing cost function minimizing one or more parameters to rebalance the cost function.

11. The method of claim 7, further comprising:

choosing and fitting parameters of said probabilistic classification hypothesis function based on a training data set, said training data set comprising one or more of:

historical data representing virtual machine VM availability and I/O bandwidth features for previously running jobs, and corresponding cost of historical jobs that were run;

corresponding historical data representing VM features and hosted environment features; and characteristics of said previously run jobs.

12. The method of claim 11, further comprising:

generating, at said hardware processor, said learned model according to a supervised learning method conducted using said input training data set.

13. A computer readable medium comprising instructions that, when executed by at least one processor comprising hardware, configure the at least one hardware processor to:

receive, from a user, input data representing a current request to run a job on a VM, said current job having associated job characteristics;

receive input data representing features associated with VMs running on a public networked or private networked host computing environment, said environment comprising features associated with a host computing environment;

run a learned model for selecting one of: the public network or private network as a host computing environment to run said current requested job on a VM resource, said learned model based on a minimized cost function comprising a probabilistic classifier hypothesis function for a multiclass classifier parameterized according to one or more job characteristics, VM features, and host computing environment features associated with running the current requested job on a VM resource, and fitting parameters with factor weightages based on a sigmoid function to achieve a balance between a computational efficiency, cost effectiveness, and I/O operational efficiency for running the current requested job on the selected private networked or public networked host computing environment; and allocate the VM resource to run said current requested job on said selected host computing environment.

14. The computer readable medium of claim 13, comprising further instructions to configure the at least one hardware processor to:

receive further input data from a request queue maintaining current additional job requests received from users awaiting allocation to a VM resource, and said input data of current additional job requests used as parameters of said cost function.

* * * * *